A. Palmer.
Mower.

Nº 12323  Patented Jan. 30, 1855.

Witnesses.
I. Page Nix
Byron E. Huntley

Inventor.
Aaron Palmer

UNITED STATES PATENT OFFICE.

AARON PALMER, OF BROCKPORT, NEW YORK.

IMPROVEMENT IN THE CONSTRUCTION OF THE FRAMES OF GRASS-HARVESTERS.

Specification forming part of Letters Patent No. 12,323, dated January 30, 1855.

*To all whom it may concern:*

Be it known that I, AARON PALMER, of Brockport, in the county of Monroe and State of New York, have invented a new and useful Improvement on Mowing-Machines; and I do hereby declare that the following is a full, clear, and exact description of the construction and operation of the same, reference being had to the annexed drawings, making a part of this specification, in which—

Figure 1:
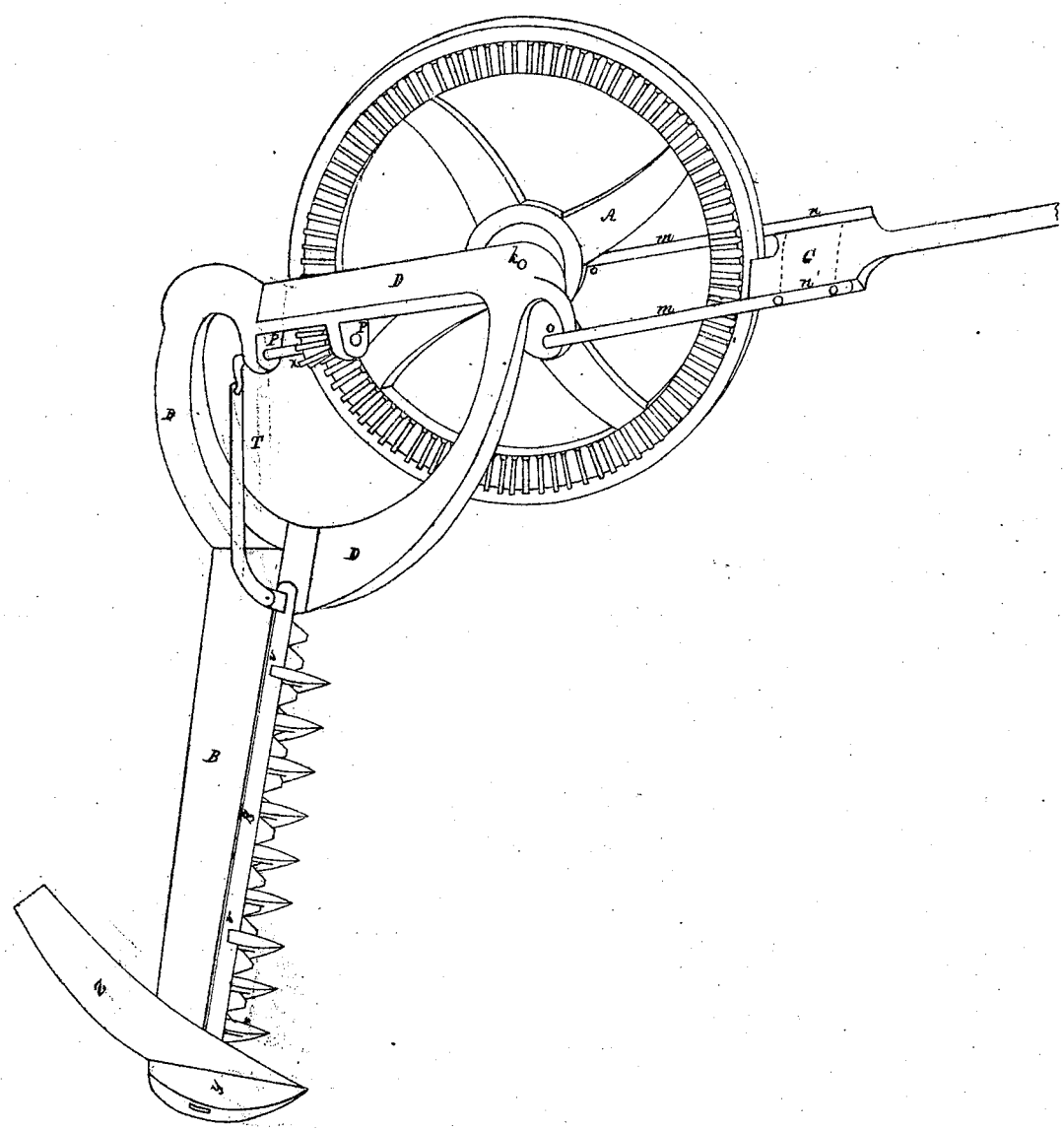

Figure 1 is a perspective view, and Figs. 2, 3, 4, and 5 are sectional parts.

To enable others skilled in the art to make and use my invention, I will proceed to describe its construction and operation.

The driving-wheel A, Fig. 1, is made of cast-iron, is thirty inches in diameter, with four or six arms. The face or tread of the wheel is five inches wide and about five-eighths of an inch thick, with a rim of bevel-gear attached to its side, the diameter of which is about twenty-six inches, and has one hundred teeth or cogs, which mesh into the pinion $x$, Fig. 1.

The frame D D D is made of cast-iron, and has an axle at $k$, Fig. 1, on which the wheel A revolves. The frame descends from the axle to the rear of the wheel to within about nine inches of the ground, where it is turned at right angles and curves to the ground a distance of about eighteen inches from a line parallel to the plane of the wheel. Another part of the frame D curves from the axle outward and downward until it connects with the other part, just described, on the ground at a point where the cutter-beam is fastened to it. The average width of this frame is about three inches and the thickness five-eighths of an inch. This construction and arrangement of the curved frame leaves unobstructed space below the frame and between the wheel and the cutters, allowing the machine to pass freely and without clogging over the cut grass or grain, and in this respect may appear at first to be coincident with Wm. F. Ketchum's reaping-machine, reissued January 11, 1853; but the difference is my cutter-bar and cutters are not opposite the plane of the wheel, but are in rear of it; neither are they in or nearly in the same vertical plane with the axle on which the frame hangs and vibrates, but are nearly two feet in rear of the axle and entirely without the plane of the wheel.

Figure 2:
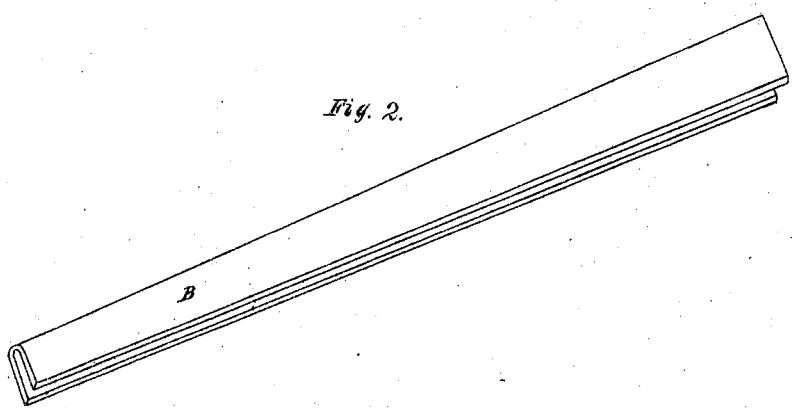

My cutter-beam, as represented by Fig. 2, and as seen at letter B, Fig. 1, I make of three-eighths-inch boiler-iron, which, after being bent in the form of the letter U, is about five inches wide at the widest and three inches wide at the narrowest end.

Figure 3:
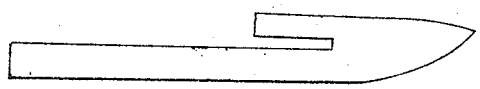
Figure 4:
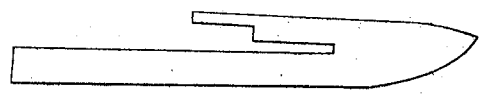

I make my knife-guards in the form represented by Figs. 3 and 4, and insert them three inches apart in the hollow of the cutter-beam, Fig. 2, and rivet them to the cutter-beam, or pour softer metal in beside them to hold them to their places.

The braces $m$ $m$ are made of one and one-eighth inch wrought-iron, and attached to the pole or tongue C by bolts, as seen at $n$ $n$, Fig. 1, and are fastened by any suitable joint to the frame D D D at $o$ $o$, Fig. 1, at a point lower than the axle $k$.

Figure 5:
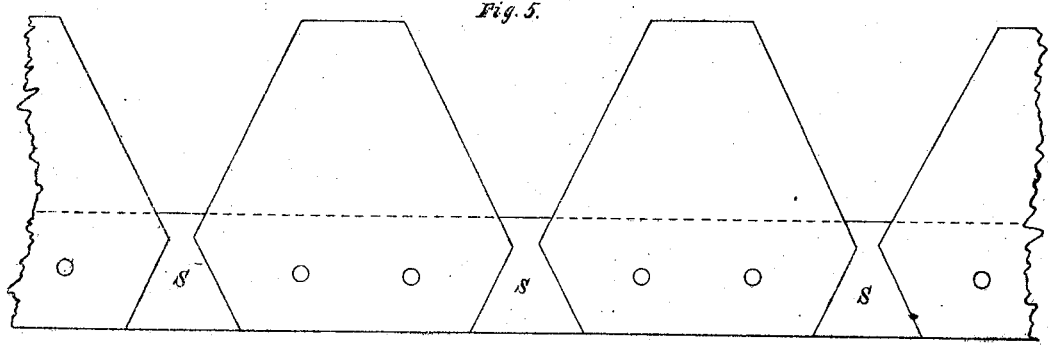

My cutters are of the form and size represented at Fig. 5. They are made of cast-steel, and are about one-eighth of an inch thick, and are riveted to the bar of iron. (Seen at $s$ $s$ $s$, Fig. 5.) This bar of iron is one inch wide and three-sixteenths of an inch thick. These cutters are placed on the bar three inches apart from center to center, which leaves a short space between them on the under side of the bar, which prevents their clogging with grass. Part of the guards are made as represented by Fig. 4, and extend over the cutter-bar $s$ to hold it to its place, as seen at $v$ $v$, Fig. 1.

My pitman is about twenty inches long, and made of three-fourths-inch round iron, somewhat flattened, and is seen at T, Fig. 1.

On the under side of the frame D D D, at P P, Fig. 1, is the crank-shaft, having its bearings on projections from the frame D D D, and contains the pinion, which has ten cogs, as seen at $x$, Fig. 1. The pitman T is attached to this crank and to the cutter-bar S. The frame D D D operates as a lever, of which the axle of the wheel is the fulcrum. The cutter-beam B, being attached to one end of this (frame) lever and in rear of the driving-wheel, acts freely up and down, accommodating itself to uneven surfaces. By this arrangement the wheel may run over obstructions or sudden elevations of the ground without affecting the horizontal position of the cutter-beam, which is not the case with Ketchum's machine. Another advantage is the wheel and cutter-beam do not pass simultaneously into a dead-furrow, but the wheel is drawn out before the cutter-beam passes in, thereby greatly reducing the draft of the machine at such times. Again, in cutting lengthwise of the furrow the wheel may run in the furrow and yet the cutter-beam preserve its horizontal position and cut close to the ground. These are important features when it is known that most meadows are thrown into beds having a dead-furrow or water-course every twelve or fifteen feet. The pole or tongue C being fastened to the frame at a point below the axle of the wheel, the draft of the team acting on this end of the (frame) lever forces the cutter-beam snug to the ground and holds it there. One great difficulty heretofore has been to keep the cutter-beam down to its place. The amount of this downward pressure may be regulated by changing the point where the braces m m are attached to the frame.

On the divider y, I attach the curved cutter and track-clearer z. This cutter is about twenty inches long, five inches wide, and is made of cast-steel, and perfectly sharp on the upper edge. This cutter aids the operation and draft of the machine very much, especially in lodged and tangled grass, as it cuts its way through, while other machines tear their way through. Being curved and so tempered as to spring freely, it effects an easy and complete separation of the cut from the uncut grass.

What I claim as my invention, and desire to secure by Letters Patent, is—

Connecting the wheel A, the cutter-beam B, and the tongue C to the frame D in the manner herein described, by which the frame operates as a lever, of which the axle of the wheel A is the fulcrum, and by which means the cutter-beam rises and falls independent of the wheel, thereby adapting itself to undulating surfaces, and by which means the draft of the team holds the cutter-beam snug to the ground, thereby causing the machine to cut close and smooth.

AARON PALMER.

Witnesses:
   I. PAGE MIX,
   BYRON E. HUNTLEY.